3,304,264
PROCESS OF CLEANING THE WINDSHIELD
Carl O. Durbin, Orchard Lake, and Gert G. Levy, Detroit, Mich., assignors to Chrysler Corporation, Highland Park, Mich., a corporation of Delaware
No Drawing. Filed Nov. 9, 1964, Ser. No. 409,948
2 Claims. (Cl. 252—153)

This application is a continuation-in-part of our copending application, Serial No. 100,014 filed April 3, 1961, now abandoned, which was a continuation of prior application, Serial No. 611,749, filed September 24, 1956, now abandoned.

This invention relates to liquid solvent compositions and a process for cleaning the glass windshields of automotive vehicles in which said compositions are utilized. The invention is further concerned with liquid solvent compositions which may be packaged as concentrate or base compositions useful alone or diluted within predetermined limits with further liquids such as alcohol and/or water for the foregoing purposes.

The invention especially relates to liquid compositions of the foregoing character which may be applied to the windshield in summer or winter by conventional windshield washer spray apparatus and be wiped therefrom by conventional oscillating blade wiper mechanisms which will in this process also remove from the windshield road film, bug and other foreign matter and residue on the windshield dissolved by or suspended by the liquid solvent and without leaving an objectionable film or fog on the windshiled apt to obstruct visibility or produce annoying reflections from the headlights of oncoming cars, and without causing injury to metallic or paint finishes of the vehicle or leave films of a nature apt to produce harmful effects thereto and without foaming which will impair operation of the windshield washer spray apparatus.

It is now customary to provide windshield washer spray and wiping mechanism on automotive vehicles and such is in fact required by law in many states. Usually a pair of fixed spray nozzles are provided adjacent the lower edge of the windshield and in adjacency to the wiper blade mechanism adapted when suitable controls are actuated to direct a spray of cleaner liquid from a source of supply thereof against the windshield in the path of the wiper blades. Two basic types of pumps are employed to force the liquid through the nozzles. One is a mechanical manually operable foot pump and the other a power operable pump. The latter types are particularly prone to air locks when the liquid cleaner composition is susceptible to objectionable foaming.

The sprayed cleaning liquid, usually a solution of alcohol and water and including a detergent for improving its cleaning property tends to spread out over the windshield and to run toward the lower edge thereof. Most of this liquid is picked up by the oscillating blades and dispersed over the path they make. In their movement the wiper blades in conjunction with the cleaner liquid, which is intended to loosen and suspend dirt and road film, scrub the windshield moving the suspended material and liquid to the side and bottom of the windshield and leaving a thin layer of the liquid on the windshield.

The water and alcohol in this thin layer of liquid remaining in the scrubbed area then evaporate leaving a thin film of wetting agent or detergent. Moreover, the liquid pushed to the side and bottom of the windshield runs onto the metallic and paint finishes of the vehicle where it may collect in puddles and unless washed off by flooding with water may remain there for some time. The water and alcohol in these puddles usually evaporate within an hour or so, leaving suspended matter and a film of the wetting agent or detergent on these surfaces. These remain for longer periods, twenty-four hours and more, the wetting agent depending upon the lowness of its vapor pressure eventually evaporating.

Of all the liquid compositions heretofore commercially offered for use in windshield washing dispensing apparatus, we are not aware of a single one that has prior to the present invention been wholly satisfactory. The reasons therefor may be found in one or more of the following objections to them:

(1) The cleaner composition did not do an effective cleaning job.

(2) The cleaner composition froze in the container or upon striking the windshield during winter weather.

(3) The cleaner compositions contained alcohols and/or alkaline soaps and/or wetting agents each of which alone or in combination with the others remained on paint and metal finishes a sufficient time before evaporating or being washed off by water to react with and cause corrosive or other damage to such finishes, for example, caused paint finishes to swell, lift or spot.

(4) The cleaning compositions left films of wetting agent on the windshield after scrubbing which in and of themselves or with water particles provided by atmospheric mist or light rain produced a cloudy effect obstructing vision and which films built up and became more opaque following repeated applications of cleaner composition.

(5) The cleaner composition created a foam on agitation which did not readily dissipate.

Moreover, isopropyl alcohol has been employed in these compositions as the alcoholic ingredient, as a carrier for the wetting agent and to prevent breakage of the bottles when the solution freezes. However, it has not been successful as an all weather cleaner since the addition of even large quantities thereof did not lower the freezing point sufficiently to facilitate its use at low temperatures, for example, $-20°$ F. Methyl alcohol has been avoided because of its substantial destructive effect on paints.

In accordance with the present invention it has been discovered after experimentation covering hundreds of formulations, that certain anionic wetting agents, to-wit, the ammonium salts of sulfate esters of nonylphenol polyethylene glycol ethers, hereinafter more particularly defined, may be combined in certain proportions with an alcohol or a mixture of alcohols with or without water to produce liquid cleaner compositions for automotive windshields substantially avoiding all the objections enumerated above and providing the desirable features necessary for a satisfactory and efficient base cleaner composition and aqueous solutions thereof. Thus it has been discovered that when these salts are used in an alcoholic cleaning solution that the film, if any, that remains on the windshield after scrubbing the windshield as described above and whether or not in the presence of water particles provided by atmospheric mist or light rain, is clear and free from opaqueness and other fog forming character and therefore unobjectionable. Moreover, it has been unexpectedly discovered that the presence of this salt in proper amount has an inhibiting effect on the reactive tendency of alcohols on paint and metal finishes in that the combination may remain on paint and metal finishes for extended periods, even for days, without harmful effect to the finish. Furthermore, although these salts are known to be high foaming dish-washing agents they have practically no stable foam characteristics in the presence of alcohol in the amounts used in the present invention.

Although the exact reasons for these beneficial actions are not fully understood and it is not desired to be bound to a particular theory, it is believed that the ammonium radical of the salt provides the liquid cleaner composition with an unusually high resolubility factor that prevents the building up of detergent residue into a haze or fog forming film. Moreover, it is also believed that the same group of this salt acts as an inhibitor for the alcohol in the presence of metal and paint finishes preventing or tolling any reaction. The importance of this feature is made more evident when it is realized that this inhibiting effect even extends to methyl alcohol which has the greatest freezing depressant effect of all the alcohols and which has heretofore been shunned in cleaner compositions because of its substantial deleterious effect on paint finishes. Furthermore, it is believed that the alcohol acts as a depressant on the inherent foaming character of this salt.

The following tables A, B, C, and D provide comparative data on the features discussed above. Thus tables A and B record observations made as a result of actual tests performed on windshields to clean the same and on paint finishes with different alcohol-water solutions; with methyl alcohol-water-detergent solutions using detergents some of which have been proposed and used for windshield cleaners and with the methyl alcohol-water-salt compound compositions of the present invention. The test compositions referred to in Table A were prepared by mixing one part of alcohol by volume with two parts by volume of water. In the case of the compositions of Table B each test composition was prepared by dissolving one part by weight of detergent or other agent in 80 parts by weight of methyl alcohol and diluting this with 200 parts by weight of water. Methyl alcohol was selected in these tests because as seen from Table A it is more destructive on paint. Each test solution was applied to painted test panel surfaces previously prepared with melamine modified alkyl body paints used in the manufacture of automotive vehicles. Observations were made of the test panels for the alcohol tests of Table A at 2 hours and 8 hours respectively and of the test panels for Table B at 8 hours, these times being sufficient to permit evaporation of the alcohol and water from the painted surfaces. At the conclusion of the test periods the panels were rinsed off with running water, examined and the results noted in the two left hand columns.

Table A

| Test Agent | Time | Observed Effect on Paint After Rinse | Removal of Road Film | Deposited Objectionable Film |
|---|---|---|---|---|
| Methyl Alcohol | 2 hrs | Severe lifting | Partially | None. |
|  | 8 hrs | do | do | Do. |
| Ethyl Alcohol | 2 hrs | Moderate lifting | Partially | None. |
|  | 8 hrs | do | do | Do. |
| Isopropyl Alcohol | 2 hrs | Moderate lifting | Partially | None. |
|  | 8 hrs | do | do | Do. |
| N-propyl Alcohol | 2 hrs | Moderate lifting | Partially | None. |
|  | 8 hrs | do | do | Do. |

Table B

| Detergent | Time | Observed Effect on Paint After Rinse | Removal of Road Film | Deposited Objectionable Film |
|---|---|---|---|---|
| Ammonium salt of sulfate ester of nonyl phenol polyethylene glycol ether having an average of 4 to 5 moles of ethylene oxide (Neutronyx S-60). | 8 hrs | None | Yes | None. |
| Sodium salt of sulfate ester of nonyl phenol polyethylene glycol ether (Neutronyx S-30). | 8 hrs | Moderate | Yes | Some build up after repeated use. |
| Nonyl phenol polyethylene glycol (Neutronyx 600). | 8 hrs | Lifting | Yes | None. |
| Sodium alkyl naphthalene sulfonate (Naccosol A) or (Santomerse). | 8 hrs | Severe lifting | Partially | Yes. |
| Sodium N-methyl-N-oleoyl Taurate (Igepon T-33). | 8 hrs | Moderate | No | Yes. |
| Alkyl phenyl polyethylene glycol ether (Tergitol NP 14). | 8 hrs | do | Yes | No. |
| Sodium salt of lauryl alcohol sulfate (Sipex-S) | 8 hrs | do | Partially | Heavy build up on continued use. |
| Ammonium salt of lauryl alcohol sulfate (Sipex A). | 8 hrs | do | do | Do. |
| Magnesium salt of lauryl alcohol sulfate (Sipex MD). | 8 hrs | do | do | Do. |
| Coconut fatty acid amide condensate (Solar CO). | 8 hrs | do | No | Caused heavy film build up. |
| Alkyl aryl sulfate (Nacconol NRSF) | 8 hrs | Severe attack | Yes | No. |
| Di octyl ester of sodium sulfosuccinic acid (Aerosol OT). | 8 hrs | None | Yes | Heavy build up on continued use. |
| Sodium sulfate derivative of 7-ethyl-2-methyl undeconol-4 (Tergitol-4). | 8 hrs | Slight lifting | Yes | Yes; leaves heavy smeary film. |
| Sodium sulfate derivative of 3-9-diethyl tridecanol-6 (Tergitol-7). | 8 hrs | None | Yes | Do. |
| Technical lauryl sodium sulfate (Duponal WA) | 8 hrs | Moderate | No | Do. |

It will be evident from the recorded observations in the two left hand columns of Tables A and B with respect to the effect on paint and from the observations recorded in the last two columns of Tables A and B as the result of actual tests made while driving a vehicle in freezing weather using each of the test compositions that only the composition of the invention passed both tests while all others failed in one respect or another. In the car tests conventional automotive windshield washer spray and wiper blade mechanisms were used and a shot of the test cleaner composition was directed against the windshield by the spray nozzle of the mechanism and the wiper permitted to oscillate 5 to 7 times so as to effect a scrubbing of the windshield. The windshield was then checked to see if, first, road film and foreign material had been removed and, secondly, if the cleaner left an opaque or fog type of film affecting clear vision. The shot operation was then continued with the wiper blades operating continuously and the spray mechanism intermittently until about one pint of cleaning composition was used. The windshield was then again examined to see if there was a build-up of the deposit. The results of all observations were then recorded.

Table C below records the results of resolubility tests employing the composition of the invention and a number of other compositions all used in making the tests reported in Table B. In each test equal volumes of each solution were placed in separate petri dishes and evaporated to dryness in an oven at 140° F. after which they were permitted to cool to room temperature. Water dropping at a constant rate from a separatory funnel was allowed to flow on the detergent or other agent residue on each dish and the time to completely wash the residue from the dish was measured with a stop watch. Duplicate tests were run and the average of the values reported. Each composition was subjected to the same water drop test.

*Table C.—Resolubility tests*

| Detergent or agent used in cleaning composition: | Time in seconds to wash off |
|---|---|
| Ammonium salt of sulfate ester of nonyl phenol polyethylene glycol | 16 |
| Nonyl phenol polyethylene glycol | 12 |
| Sodium N-methyl-N-oleoyl taurate | 47 |
| Alkyl phenyl polyethylene glycol ether | 29 |
| Sodium salt of lauryl alcohol sulfate | 59 |
| Alkyl aryl sulfate | 28 |
| Di octyl ester of sodium sulfosuccinic acid | 71 |
| Sodium sulfate derivative of 2-9-diethyl tridecanol-6 | 54 |

From Tables B and C it wil be observed that the cleaning compositions which possessed the fastest resolubility rates were the least susceptible to forming objectionable films and that when the resolubility rate was less than 30 seconds no objectionable film was produced.

*Table D*

This table compares the foaming tendency of the salt used in the composition of the present invention relative to that of certain other wetting agents of Table B in alcohol-water and water solutions.

The alcohol-water solutions were prepared by adding the wetting agent in a one to one methyl alcohol-water solution in amount sufficient to establish a one percent solution of the agent and agitating the mixture to dissolve the agent.

The water solutions of the agents were made by adding sufficient agent to make a one percent solution and agitating the mixture to dissolve the agent.

The solutions were made up in identical clean stoppered bottle in amounts to half fill the bottles. The bottles were then shaken for thirty seconds and thereafter the time recorded that it took the head of foam above the liquid surface to break.

| Agent | Alcohol-Water Solution | Water Solution |
|---|---|---|
| Ammonium Salt of Sulfate ester of nonyl phenol polyethylene glycol ether having an average of 4 to 5 moles of ethylene oxide (Neutronyx S-60). | 18 seconds | Over 4 hours. |
| Di octyl ester of sodium sulfosuccinic acid (Aerosol OT). | 204 seconds | Do. |
| Nonyl phenol polyethylene glycol | 96 seconds | Do. |
| Sodium N-methyl-N-oleoyl Taurate (Igepon T-33). | Over 1 hour | Do. |
| Technical Lauryl Sodium Sulfate (Duponal WA). | Over 4 hours | Do. |
| Ammonium salt of lauryl alcohol sulfate (Sipex A). | Over 1 hour | Do. |

It will be evident that the composition of the present invention exhibits exemplary foam breaking ability following agitation such as may be induced in a moving vehicle.

With the foregoing in view it is the principal object of the present invention to provide a novel cleaner composition, solvent or liquid addition or concentrate and aqueous solutions thereof for cleaning the windshields of automotive vehicles of dirt, road film and insects and which is substantially free of the objections to known windshield cleaning products set forth above.

A particular object is to provide aqueous cleaning compositions and a liquid concentrate or base composition therefor either useful for cleaning automotive windshields, which compositions combine both cleaning and freeze point depressant properties, that will not lift or otherwise harmfully affect paint and metallic finishes of automotive vehicles when standing thereon for substantial periods of time and that will not produce objectionable films or fogging on the windshield apt to obscure driving vision.

Other objects of our invention will appear from the following description:

As described above, a satisfactory and efficient solvent, liquid additive composition or base cleaner composition or concentrate adapted for dilution with water to make cleaning solutions for removing dirt, road film, insects and insect residue from automotive windshields in summer and winter may be prepared from a mixture consisting essentially of:

(a) a monohydric alcohol having 1 to 3 carbon atoms or mixture of a plurality thereof;
(b) an ammonium salt or salts of sulfated alkyl aryl polyethylene glycol ethers.

The alcohols may, for example, be chemically pure ethanol (ethyl alcohol), methanol (methyl alcohol), isopropyl alcohol or 1-propanol (N-propyl alcohol). These alcohols in the annhydrous form weigh 6.58 lbs., 6.60 lbs., 6.55 lbs. and 6.70 lbs., respectively per gallon. The commercial forms of these alcohols known to contain some water may also be used and hence the term alcohol wherever used throughout the specification and claims is intended to embrace either type. The main function of the alcohol is to serve as a depressant for the freezing point of the water solution in which the base composition of the invention is diluted. Another important function for it is that of a solvent to improve the cleaning action of the aqueous solution and wetting and detergent additive and to act as a dryer. Moreover, as noted above, the alcohol also serves as a foam suppressant.

Methyl alcohol is preferred because a minimum thereof will produce the greatest freezing depressant effect on water solutions of the base cleaning composition and because it makes possible windshield cleaning solutions useful at ambient air temperature of even −20° F. not possible for example where isopropyl alcohol is used. To illustrate this important advantage it will be noted that the addition to water of an equal volume of isopropyl alcohol will lower the freezing point of the water to −4° F. Using equal amounts of methanol and water will depress the freezing point of the water to −47° F. On the basis of United States Department of Commerce freezing point reports, it is noted that to depress the freezing point of water to −10° F. using methanol will require about one-half as much methyl alcohol by volume as isopropyl alcohol.

The ammonium salts of sulfated alkyl aryl polyethylene glycol ethers useful in the present invention are those having approximately 2 to 9 moles of ethylene oxide and preferably those in which the average of the ethylene oxide groups in the polyglycol ether radical of the salts is between about 3 to 5. It is to be noted that in commercial preparation of these compounds, for example, as described in U.S. Patent No. 2,758,977 to Knowles of August 14, 1956, the products are mixtures of compounds containing different mole amounts of ethylene oxide within the above range. Thus the commercial product having an average of four moles of ethylene oxide will contain some portions having less than four moles and some having greater than four moles. When the number of ethylene oxide groups in the compound exceeds approximately 9 the compound substantially loses its featured ability to inhibit the harmful effect of alcohol on paint and metal finishes and therefore such compounds are desirably avoided. Compounds having an average of about 3 to 5 moles of ethylene oxide are preferred for maximum solubility.

The salts or compounds we use may be typically represented structurally by the following formulae:

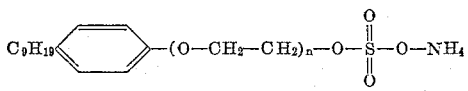

where $n$ is 2 to 9 and preferably 3 to 5.

These salts or compounds serve as wetting agents and detergents, soil suspension agents, oil emulsifying agents and organic tissue solubilizing agents. They are soluble in alcohol and water and when added thereto improve the cleaning properties of both. A particular feature of these salts or compounds is their ability in the presence of alcohol or aqueous mixtures or solutions thereof to inhibit the harmful affect of alcohol on paint and metal finishes described above. Hence, sufficient of these compounds will preferably be present in the base cleaning composition of the invention and in aqueous solutions thereof to make this function most effective.

For handling purposes and for ease of preparation of the base compositions of the invention and aqueous solutions thereof the above salts or compounds are usually prepared in concentrated solutions with a carrier liquid such as water and/or alcohol which may be any lower alkanol such as described in the patent to Knowles aforesaid including methanol, ethanol, isopropanol, normal propanol, butanol or amyl alcohol and mixtures thereof. A liquid compound such as used in this invention is procurable commercially as a 60% solution (60% by weight of the salt) under the trade name "Neutronyx S–60." The liquid salt concentrate weighs approximately 8.84 lbs./gal. or 643.8 gms/liter. Presently the liquid carrier for the salt is a solution of water and alcohol (approximately 22–27% by weight of water) but the salt is also obtainable in an all water or alcohol carrier and in various concentrations.

The liquid salt concentrate may be mixed with any of the aforementioned alcohols having 1 to 3 carbon atoms or mixtures thereof in a wide range of proportions to produce a base solution useful in that form or with the addition of predetermined amounts of water. However, when too much of the salt or liquid salt concentrate is used in the base composition excessive frothing may occur when it is substantially diluted with water and such is to be avoided since it may interfere with the normal operation of the windshield wiper spray mechanism. On the other hand, insufficient liquid salt concentrate will not provide adequate detergency action or inhibit the action of the alcohol on the paint and metal finishes. Accordingly, it is preferred that a maximum of about one (1) part by volume of the 60% salt concentrate to about nine (9) parts by volume of alcohol and a minimum of about one (1) part by volume of the 60% salt concentrate to about two hundred (200) parts by volume of alcohol be employed in the base solution. This is equivalent to a range of about one part by weight of salt to between 12 to 264 parts by weight of alcohol.

As a low cost and all around cleaner a base solution containing 1 part by volume of the 60% salt concentrate to 100 parts by volume of alcohol is preferred. This is equivalent to about 1 part by weight of salt to about 132 parts by weight of alcohol.

The base solution or formulation aforesaid may be diluted with water in any proportion and it will not harmfully effect the paint or other finish on automotive bodies. When diluted with two parts of water by volume, it will efficiently and fully remove road film composed of dirt, oil, etc. from the windshield. When diluted with equal or less volumes of water, the base solution will also readily affect removal of insects and insect residue from the windshield or painted surface of the vehicle. It will not leave any objectionable film of its own when used in any dilution. It may be used in a dilution of even as little as one part by volume of base solution per 28 parts by volume of combined base solution and water for applications above 32° F. and when as great as 26 parts by volume of base solution to 45 parts by volume of combined base solution and water for winter applications, the latter proportion being good for ambient air temperatures of −20° F.

For actual winter use in a windshield jet cleaner and with conventional wiper blade mechanism a cleaning solution effective in its removal of road film at air temperatures of 0° F. and that will not freeze at this temperature during normal operation or leave a fogging film may be made by diluting one pint (16 fluid oz.) of base solution aforesaid (prepared from 1 part by volume of the 60% liquid salt concentrate to 100 parts by volume of methyl alcohol) with 1.8 pints (29 fluid oz.) of water. This will produce 2.8 pints (45 fluid oz.) of total cleaner solution. This cleaner composition will have a freezing point of −15° F.

For summer use a concentration of at least ⅛ pint (2 fluid oz.) of the same base solution aforesaid to 3⅜ pints (54 fluid oz.) of water is preferred for effectively cleaning road film from the windshield by the conventional mechanism. This will produce 3.5 pints (56 fluid oz.) of combined solution. However, even weaker solutions in the proportion of 1/16 pint (1 fluid oz.) of the base solution aforesaid to 2.74 pints (44 fluid oz.) of water (2.8 pints or 45 fluid oz. of combined solution) have given good results.

It will be understood that other ingredients may be added to the base solutions aforesaid so long as the minimum amounts of essential ingredients are present. For example, it is customary to include a small amount of a dye such as methyl violet dye therein.

From the above description of our invention it will be evident that we have provided an efficient and practical solvent or cleaner solution or composition for cleaning the glass windshields of automotive and other vehicles in summer or winter of road film and insects by conventional wiper mechanism and that is capable of performing this function without leaving any vision obscuring films or harmfully affecting the paint or metal finish of the vehicle.

It will be understood that various changes and modifications in the compositions of our invention will suggest themselves to those skilled in the art without departing from the spirit or intent of our invention and all such changes, modifications, and equivalents are contemplated. For example, the base salt solution may be prepared by direct synthesis of the salt in quantities of alcohol equivalent to that desired in the base solution thereby avoiding preparing a liquid salt concentrate.

We claim:

1. In the process of cleaning the windshield of an automotive vehicle equipped with windshield washing apparatus including spray means for applying a liquid cleaning composition to the windshield and wiper blades for wiping the composition and road film and foreign matter suspended therein from the windshield to produce a clear windshield, the improvement comprising spraying the surface of the windshield with a liquid cleaning composition consisting essentially of ammonium salt selected from the group consisting of ammonium salts of sulfate esters of nonylphenol polyethylene glycol ether having between about 2 to 9 moles of ethylene oxide and mixtures thereof, monohydric alcohol containing between 1 to 3 carbon atoms and water, said ingredients being present in the proportion of about 12 to 264 parts by weight of alcohol to each part by weight of ammonium salt and about 19 to 702 parts by volume of water to each 26 parts by volume of combined alcohol and salt, whereby to dissolve road film on said windshield and suspend any foreign matter thereon in said cleaning composition and causing said blades to wipe said foreign matter and cleaning composition from the windshield all whereby to produce a clear windshield without icing or leaving objectionable fog-forming film on the same and without harmfully affecting the body paint of said vehicle contacted during said cleaning operation and upon remaining on said paint after said operations are completed.

2. The process as claimed in claim 1 wherein said ammonium salt is a mixture of ammonium salts of sulfate esters of nonylphenol polyethylene glycol ether and in which mixture the average of the ethylene oxide groups in the polyglycol ether radicals of the salts is between about 3 to 5.

References Cited by the Examiner

UNITED STATES PATENTS

| | | | |
|---|---|---|---|
| 2,386,106 | 10/1945 | Gangloff | 252—161 |
| 2,632,911 | 3/1953 | Deibel | 15—250.04 |
| 2,758,977 | 8/1956 | Knowles et al. | 252—153 |
| 2,816,316 | 12/1957 | Oishei | 15—250.02 |
| 2,877,187 | 3/1959 | Henderson et al. | 252—153 |

OTHER REFERENCES

Lesser: "Soap and Sanitary Chemicals," September 1952, pages 46–49, 105 and 106.

LEON D. ROSDOL, *Primary Examiner.*

JULIUS GREENWALD, *Examiner.*

A. T. MEYERS, M. WEINBLATT,
*Assistant Examiners.*